United States Patent [19]
Yamada

[11] Patent Number: 5,369,471
[45] Date of Patent: Nov. 29, 1994

[54] COMMUNICATION SYSTEM FOR IMPLEMENTING MAINTENANCE OF COPYING MACHINE

[75] Inventor: Yoshikado Yamada, Kita-Katsuragi, Japan

[73] Assignee: Sharp Kabushiki Kaisha, Osaka, Japan

[21] Appl. No.: 976,356

[22] Filed: Nov. 16, 1992

[30] Foreign Application Priority Data

Nov. 20, 1991 [JP] Japan ................................ 3-304628
Nov. 20, 1991 [JP] Japan ................................ 3-304629

[51] Int. Cl.$^5$ ........................................ G03G 21/00
[52] U.S. Cl. ..................................... 355/208; 355/206
[58] Field of Search ............... 355/203, 204, 205, 206, 355/207, 208; 371/16.4, 16.5; 364/132, 184, 185, 186; 379/92, 93, 100, 106, 107

[56] References Cited

U.S. PATENT DOCUMENTS

| | | | |
|---|---|---|---|
| 4,126,162 | 11/1978 | Martin et al. | 379/107 X |
| 4,241,237 | 12/1980 | Paraskevakos et al. | 179/2 AM |
| 5,057,866 | 10/1991 | Hill, Jr. et al. | 355/205 X |
| 5,077,582 | 12/1991 | Kravette et al. | 355/206 |
| 5,184,179 | 2/1993 | Tarr et al. | 355/206 |
| 5,193,111 | 3/1993 | Matty et al. | 379/106 |
| 5,214,772 | 5/1993 | Weinberger et al. | 371/16.4 X |
| 5,216,461 | 6/1993 | Maekawa et al. | 355/202 |
| 5,220,380 | 6/1993 | Hirata et al. | 355/204 |
| 5,270,775 | 12/1993 | Suzuki | 355/204 |

FOREIGN PATENT DOCUMENTS

63-286095 11/1988 Japan .

OTHER PUBLICATIONS

Japanese Patent Publication (Kokoku) No. 3-52626, published on Aug. 12, 1991.

Primary Examiner—A. T. Grimley
Assistant Examiner—Nestor R. Ramirez
Attorney, Agent, or Firm—David G. Conlin; Robert F. O'Connell

[57] ABSTRACT

A communication system for implementing maintenance of a copying machine is arranged to have one or more copying terminals, a host computer, and a communication line connecting both with each other. The copying terminal provides a counter for counting maintenance data such as a total number of copied sheets or jammed sheets, input keys, and a communication modem. The host computer provides a communication modem. The copying terminal has an operation unit for entering communication conditions such as a maintenance data transmission time by handling some input keys and a modem for sending the maintenance data to the host computer on the input data. The host computer also provides a standard timer for synchronously controlling the timers provided in the copying terminals so that the times indicated by all the timers are made equal.

2 Claims, 8 Drawing Sheets

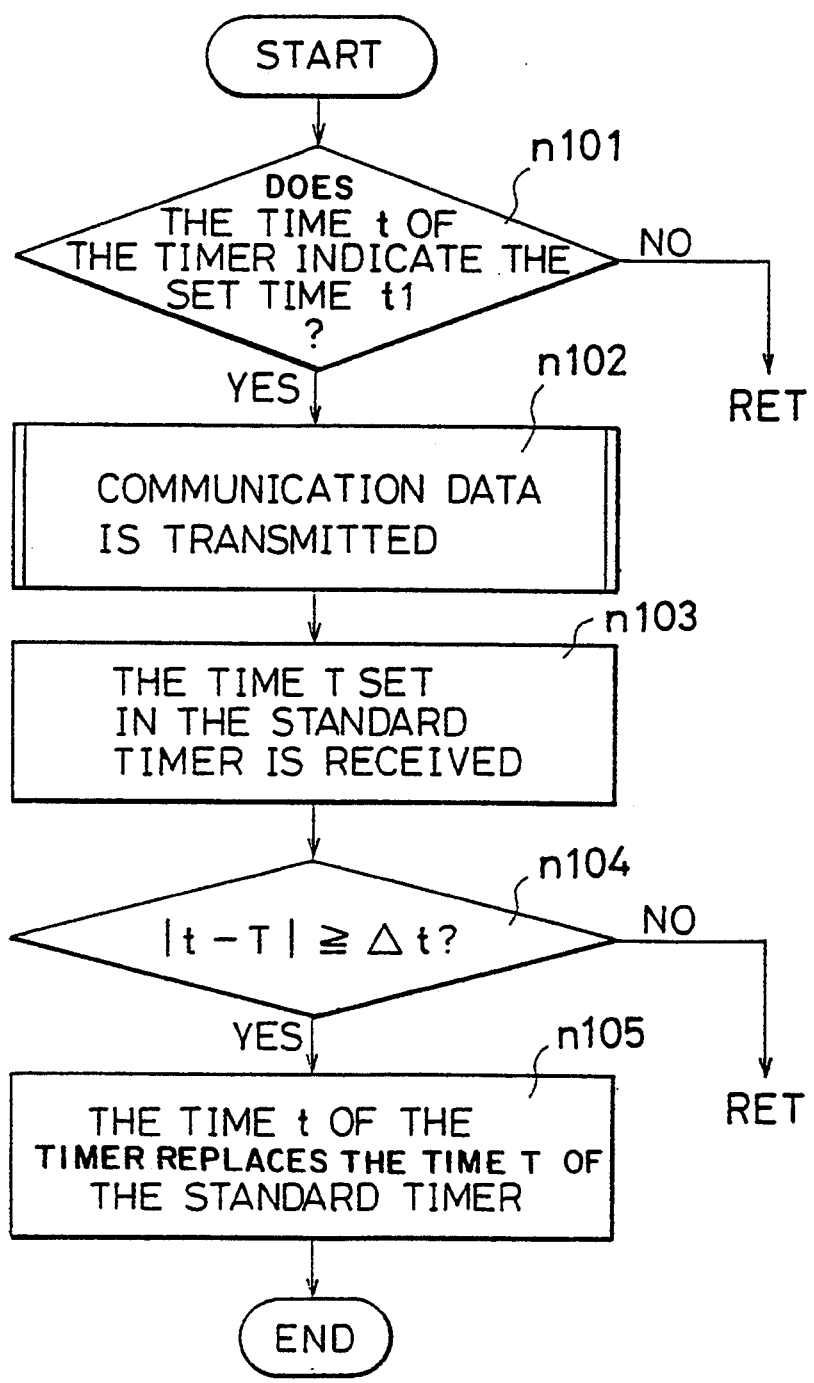

COMMUNICATION SYSTEM FOR IMPLEMENTING MAINTENANCE OF COPYING MACHINE

BACKGROUND OF THE INVENTION

1. Field of the Invention

The present invention relates to a communication system for implementing maintenance of a copying machine, and more particularly to a communication system which operates to connect a copying terminal provided with a copying machine on the side of a user with a host computer installed in a service station.

2. Description of the Related Art

As far as the inventors of the present application know, the currently available copying machine counts a total number of copied sheets and a number of jammed sheets and uses them as a criterion for the maintenance. To read such count values, a maintenance personnel routinely calls at the user's office and handles an operation panel provided normally on the top of the copying machine body. This routine work takes too much time and is so costly, because it needs the maintenance personnel to do the routine visit to the user's office. To overcome these shortcomings, in recent days, the inventors of the present application know that a communication system has been studied where the read/write of data is carried out in a host computer installed in a service station through a phone line for automating and saving the time and labor of count reading and billing operations. Through this communication system, the maintenance data such as the total count values are routinely transmitted to the host computer so that the maintenance personnel may not need to visit the user's office for reading those count values. The maintenance time is determined on the data sent from the user's office.

However, disadvantageously to this system, each copying machine may have its own settings such as a maintenance period (defined depending on a predetermined time or count value) and some other communication conditions of its service station. The known communication system has predetermined communication settings such as a data transfer period. For example, when the copied sheet (count value) reaches 1000, the count value is sent to the host computer. As such, the known communication system provides no capability of doing data transmission according to the kind of the copying machine or the maintenance policy of each maintenance personnel.

As another disadvantage, the known communication system is arranged so that a plurality of copying terminals are connected to the host computer through the communication line. If, for example, the two pieces of maintenance data sent from the two copying terminals collide with each other on the communication line, the data transmission is jammed. To overcome this jamming, each copying terminal provides a timer so that the transmitting time of one copying terminal is shifted from that of another copying terminal for preventing collision of the data transmission timings. However, if a time lag takes place in the timer of each copying terminal, the data collision may be brought about though the actual transmitting times are set differently.

SUMMARY OF THE INVENTION

It is an object of the present invention to provide a communication system for implementing maintenance of a copying machine which is capable of setting communication conditions such as a transmitting period of maintenance data according to each copying machine.

It is another object of the present invention to provide a communication system for implementing maintenance of a copying machine which is capable of preventing collision of transmission timings of the data for maintenance.

In carrying out the object, the communication system according to an aspect of the invention includes: a copying terminal having a counter for counting data for maintenance, input keys, and a communication modem; a host computer having a communication modem; and a communication line connecting the copying terminal with the host computer; the copying terminal further having; means for inputting communication conditions like a maintenance data transmission time by handling the input keys; and means for sending the maintenance data to the host computer based on the input communication conditions.

In operation, the communication system is capable of entering the transmitting time of the data for maintenance and the other communication conditions by handling keys. On termination of entering the communication conditions such as the transmitting time by handling keys, the counter value is automatically sent from the copying terminal to the host computer according to the set conditions.

As mentioned above, since the communication system provides a capability of freely entering the communication conditions by handling the keys, the communication conditions are allowed to be set according to the kind of the copying machine and the maintenance policy of each maintenance personnel.

In carrying out the other object, a communication system for implementing maintenance of a copying machine according to another aspect of the invention includes: a plurality of copying terminals having their own timers; and a host computer having a standard timer and being connected to the copying terminals; the timer of each copying terminal having a different set time from another, on the time which maintenance data is sent to the host computer; the copying terminal having means for comparing a time of the timer and a time of the standard timer received from the host computer after sending the maintenance data to the host computer, if the difference between them is equal to or more than a predetermined value, setting the time of the standard timer to the timer; and the host computer having means for sending a time of the standard timer to the copying terminal after receiving the maintenance data from the copying terminal having a different set time from another, on the time which maintenance data is sent to the host computer.

In operation, the timer of each copying terminal is synchronous to the standard timer of the host computer. Hence, the timers of all the copying terminals connected to the host computer indicate the same time. The copying terminals are enabled to reliably send the data for maintenance to the host computer on the times set by their own timers differently. Hence, no collision takes place in the transmitting of timings of the data for maintenance.

Further objects and advantages of the present invention will be apparent from the following description of the preferred embodiments of the invention as illustrated in the accompanying drawings.

BRIEF DESCRIPTION OF THE DRAWINGS

FIG. 7 is a flowchart showing a partial operation of the communication system shown in FIG. 6.

DESCRIPTION OF THE PREFERRED EMBODIMENTS

Herein, the description will be directed to a communication system for implementing maintenance of a copying machine according to an embodiment of the invention as referring to FIGS. 1 to 5.

Figure 1:
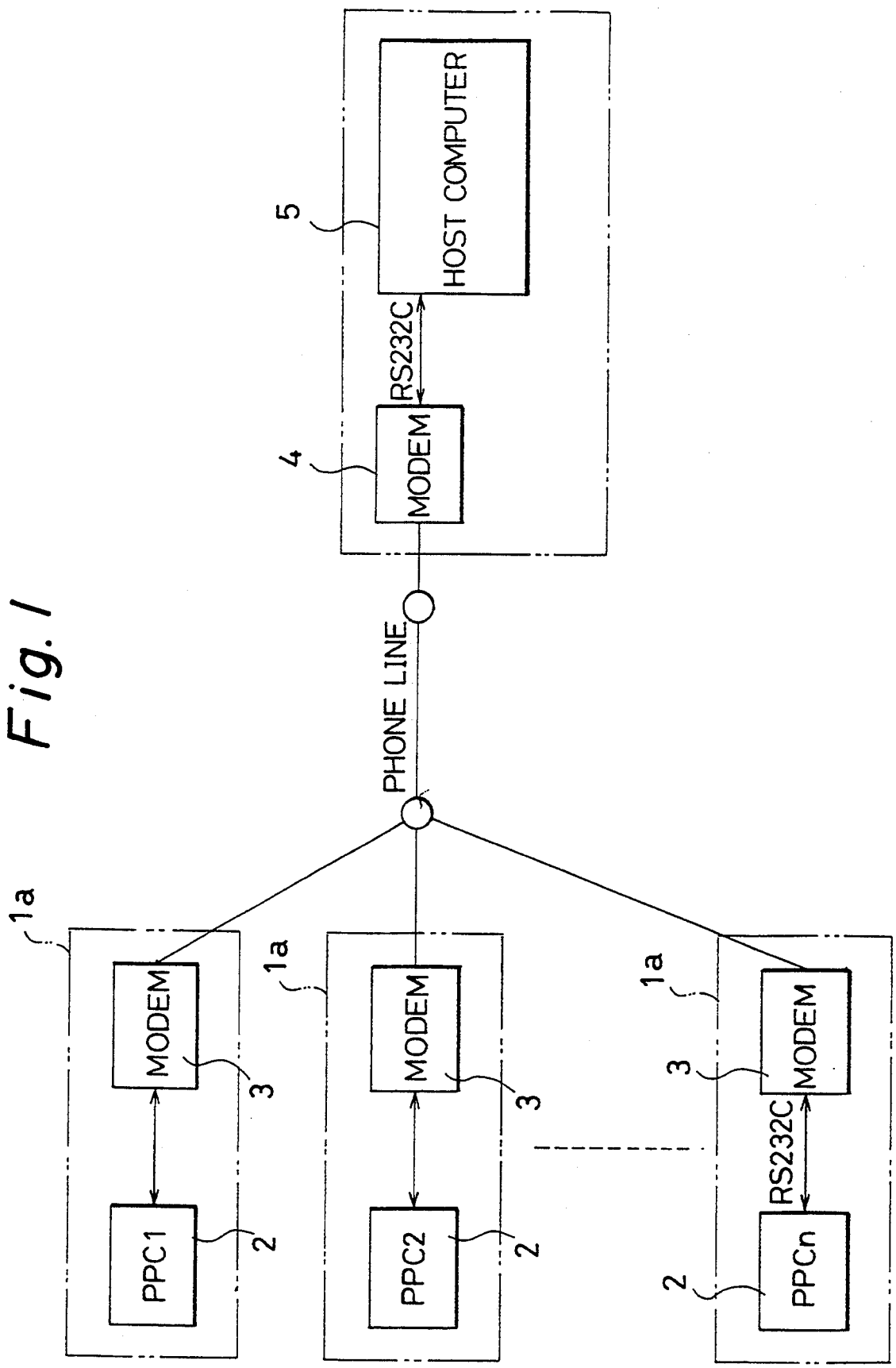
FIG. 1 is a block diagram showing a communication system for implementing maintenance of a copying machine according to an embodiment of the invention.

FIG. 1 is a block diagram showing the overall communication system of this embodiment. Copying terminals 1a are provided on the user's side. Each copying terminal provides a copying machine 2 and a modem controller 3, which are connected through a RS232C line so as to communicate communication data such as a count value of the copying machine 2 and communication conditions with each other. On the service station, there are provided a communication modem 4 and a host computer 5 which are connected through a RS232C line. The modem controller 3 is connected to the communication modem 4 through a public phone line so that the data is communicated between the copying machine 2 and the host computer 5.

Figure 2:
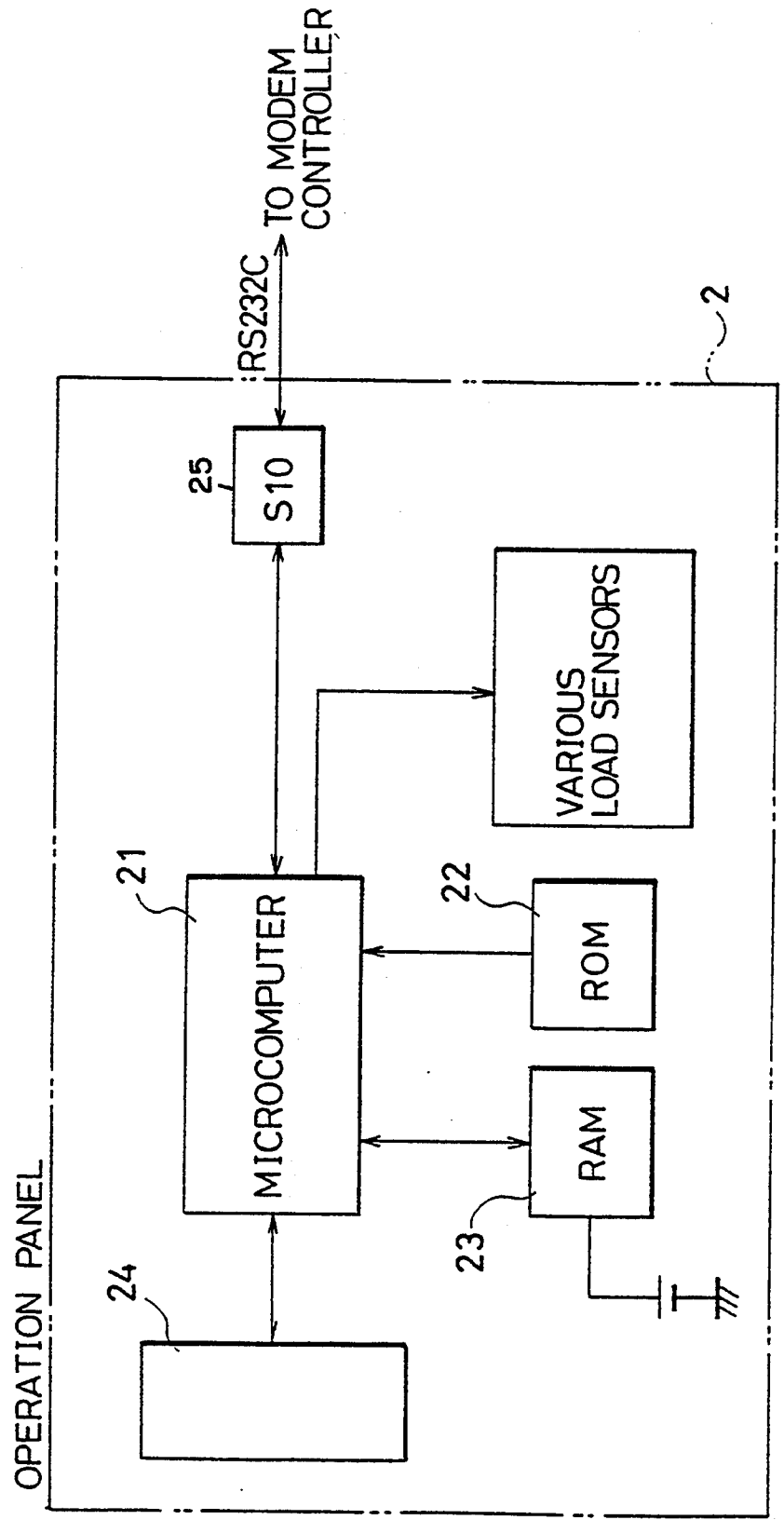
FIG. 2 is a block diagram showing a copying machine included in the copying terminal of the communication system shown in FIG. 1.

FIG. 2 is a block diagram showing the copying machine 2. The copying machine is controlled by a microcomputer 21. A numeral 22 denotes a ROM storing a control program. A numeral 23 denotes a RAM which provides a count area for storing a count value of copied sheets and jammed sheets and another area for storing communication data. A numeral 24 denotes an operation panel which provides template keys, input keys such as a print switch and a display for indicating the set state and S10 is a serial I/O unit 25 used to transmit data to the modem controller.

Figure 3:
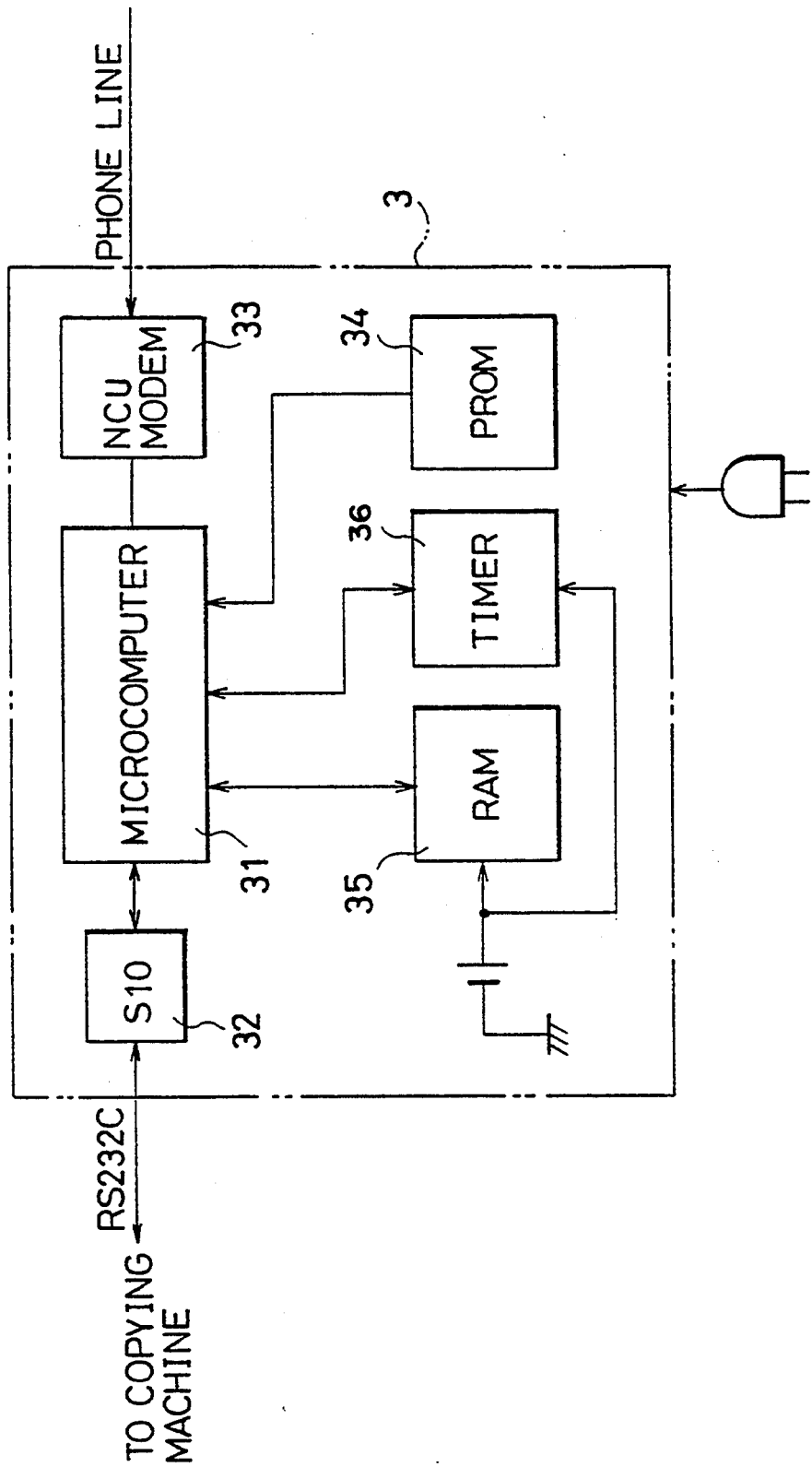
FIG. 3 is a block diagram showing a modem controller included in the modem controller of the communication system shown in FIG. 1.

FIG. 3 is a block diagram showing a modem controller 3 provided in the copying terminal 1a. The modem controller 3 is arranged to have a serial I/O unit 32, a NCU (Network Control Unit) modem 33, a programmable ROM 34, a RAM 35, and a timer 36. The serial I/O unit 32 operates to receive the data sent through the RS232C line and send it to the microcomputer 31. The NCU modem 33 serves to put the data on the phone line. The programmable ROM 34 stores an operation program of the microcomputer 31. The RAM 35 is backed up by a battery (not shown) and temporarily stores the communication data.

Figure 4A:
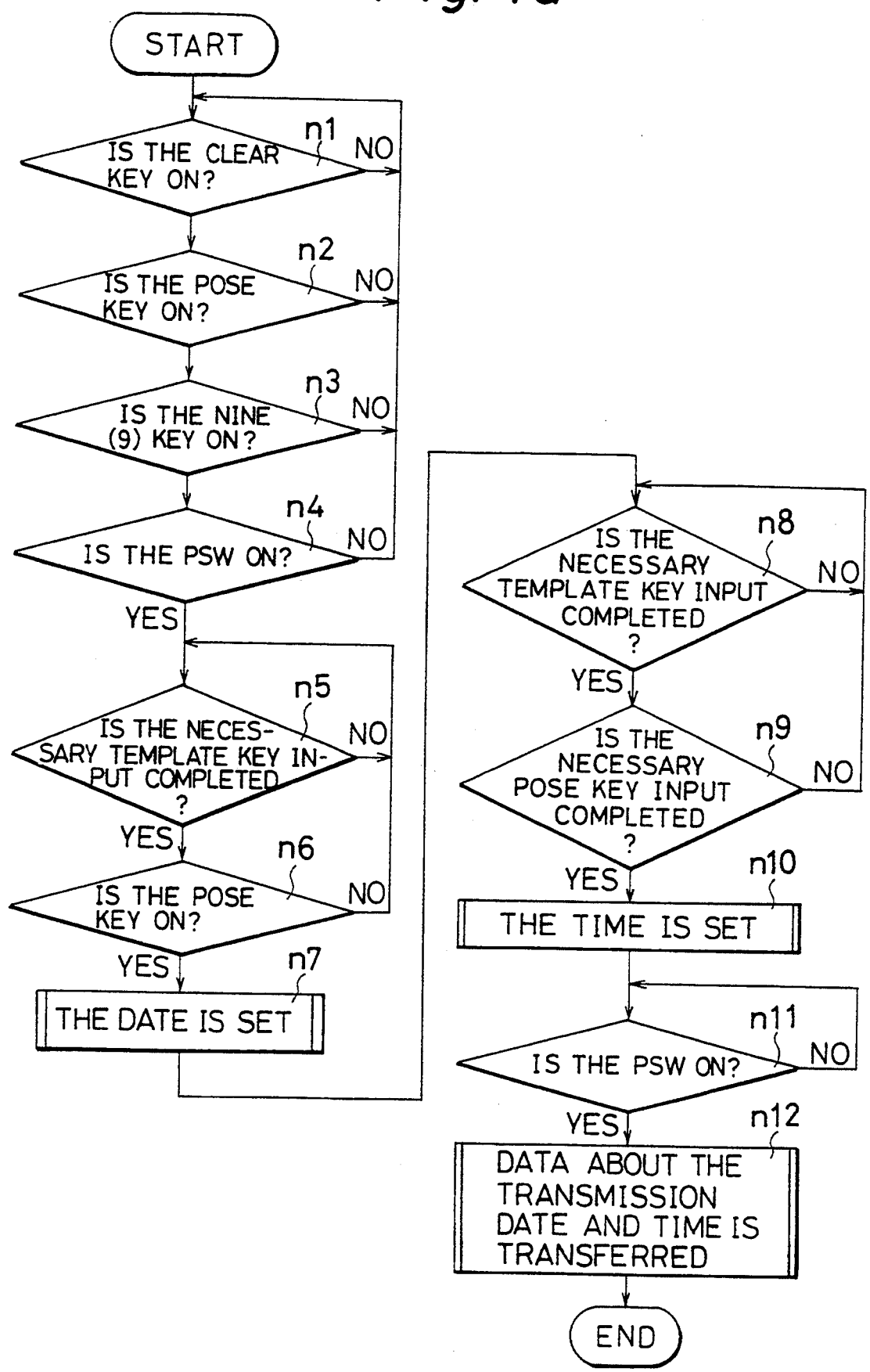
FIGS. 4a and 4b are flowcharts showing a partial operation of the communication system shown in FIG. 1.
Figure 4B:
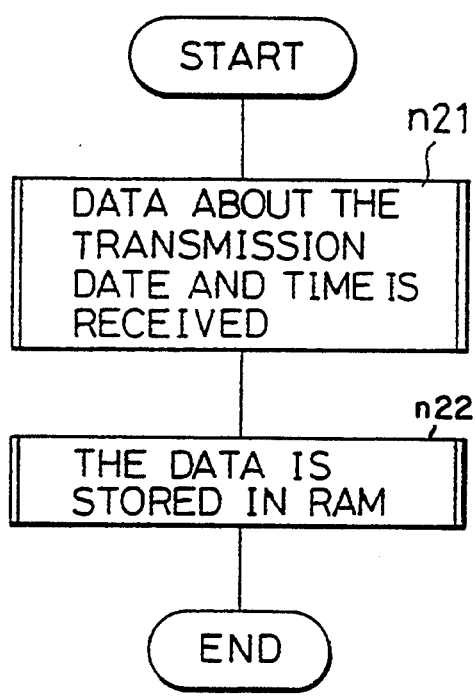
Figure 5:
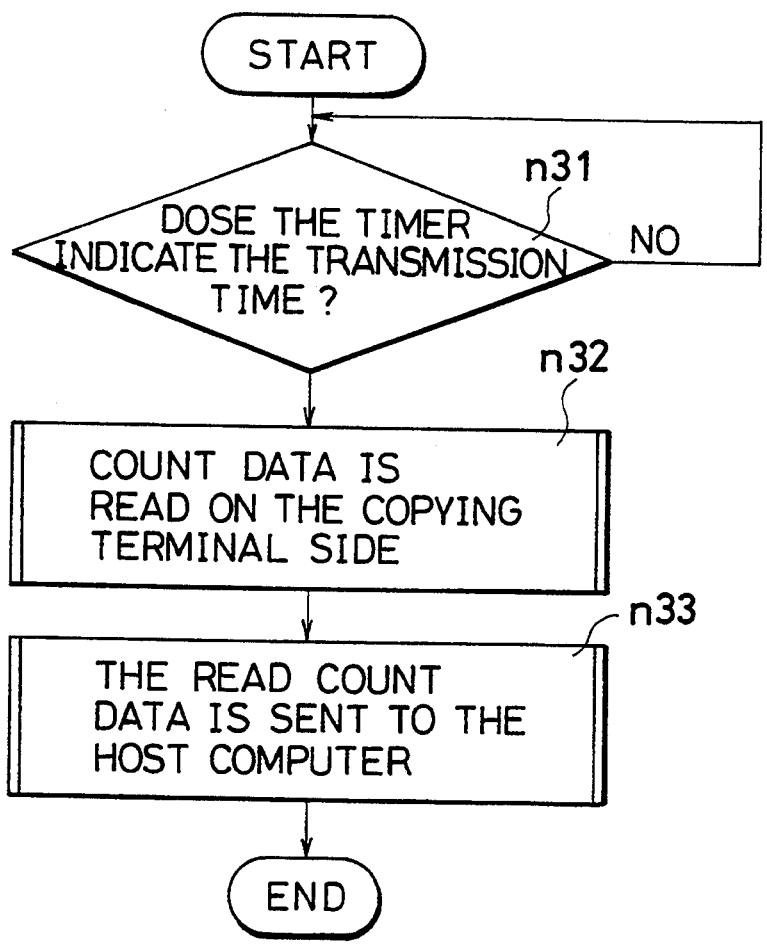
FIG. 5 is a flowchart showing a partial operation of the communication system shown in FIG. 1.

Then, the procedure executed in the communication system arranged above will be partially described by referring to FIGS. 4a, 4b and 5

At first, the description will be directed to the procedure for setting any transmitting time. n1 to n4 denote steps for key handling for setting the communication conditions. That is, the communication conditions are set by handling a clear key, a pose key, a pose (9) key and an PSW key within a constant time in the describing sequence of the n1 to n4. It goes without saying that those keys are mere examples and the number, the kinds and the sequence of the keys to be handled are not limited to those examples. When the communication conditions are set, the date and the time on which the communication is implemented are entered. The date is entered by handling the template keys. Then, by handling the pose key, the input date is fixed and stored (n5 to n8 to n7). Likewise, by handling the template keys, the time is entered. Then, by handling the pose keys (function keys), the time is fixed and stored (n8 to n9 to n10). If the date and the time on which the communication is done are set in the foregoing manner, on the set time, the data is transmitted to the host computer. In place of the date and the time, the other kind of data is allowed to be entered as a time on which the data transmission is carried out. For example, it is possible to enter as such a time a fixed count value of copied sheets (1000, 30000, etc.). In place of the time on which the data transmission is done, another communication condition is allowed to be entered.

After terminating the input of the data (date and time) about the start of the communication, by handling the print switch (function key), the data about the input date and the time is sent to the modem controller 3 (n11 to n12). In receipt of the input date and time, the modem controller 3 puts the data into the RAM. Later, based on the data, the data transmission proceeds (n21 to n22 of FIG. 4b). That is, when the time of the timer coincides with the data about the date and time for data transmission stored in the RAM, the microcomputer 21 starts to access the copying machine 2 for reading the data about the total count value of the copied sheets and send the data to the host computer of the service station (n31 to n32 to n33 of FIG. 5).

Figure 6:
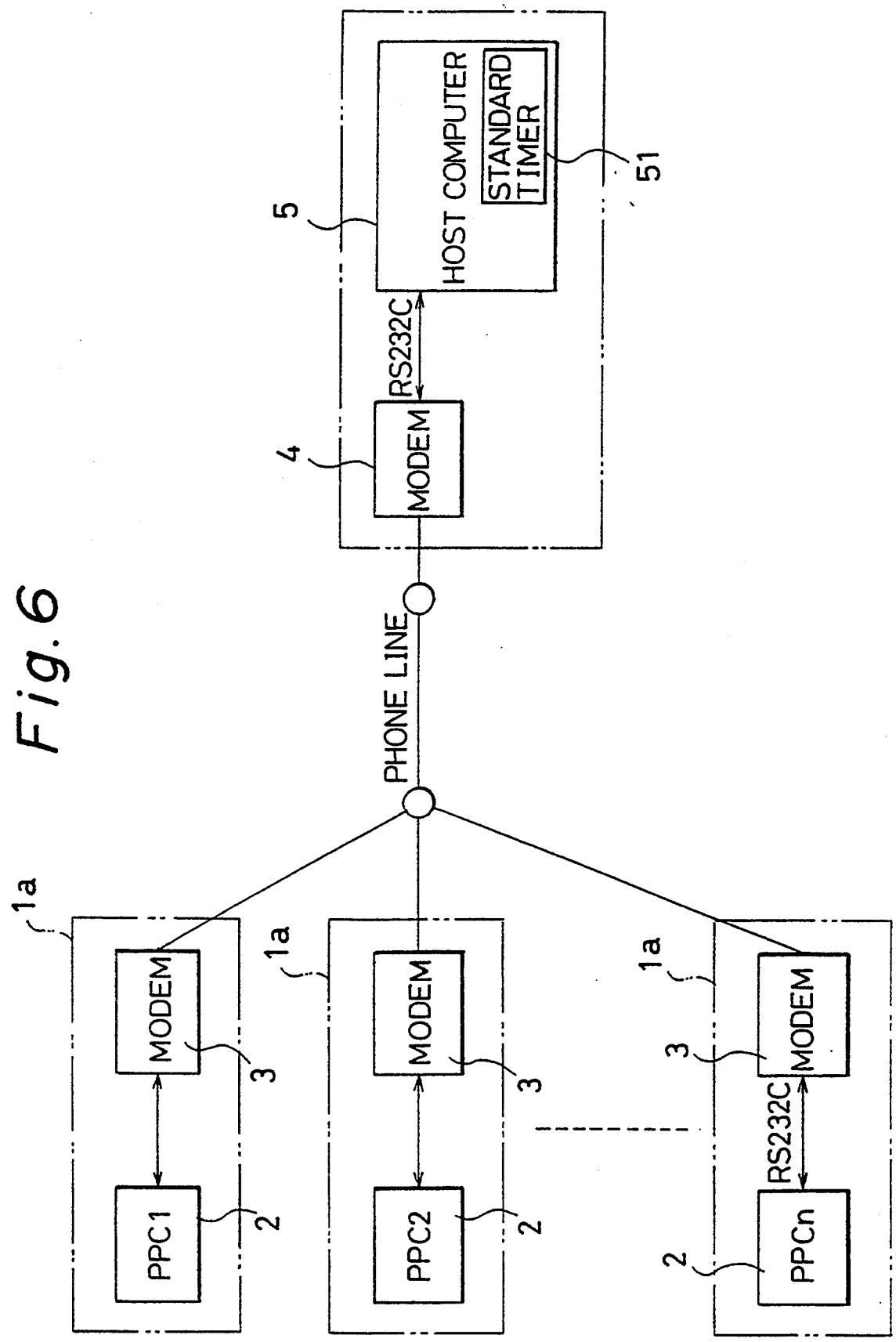
FIG. 6 is a block diagram showing a communication system for implementing maintenance of a copying machine according to another embodiment of the invention.

In turn, the description will be directed to a communication system for implementing maintenance of a copying machine according to another embodiment of the invention as referring to FIGS. 6 to 7, in which the same components as those shown in FIGS. 1 to 5 are referenced by the same numbers.

FIG. 6 is a block diagram showing the overall arrangement of the communication system copying terminals 1a are provided on the user side. Each copying terminal provides a copying machine 2 and a modem controller 3 which are connected through a RS232C line so that the communication data such as a count value and the communication data are sent and received between them. On the service station side, there are provided a communication modem 4 and a host computer 5 which are connected through a RS232C line. The modem controller 3 is connected to the communication modem 4 through a phone line so as to send and receive the data between the copying machine 2 and the host computer 5. As shown, the host computer 5 provides a standard timer 51.

The standard timer 51 synchronously controls all the timers of the copying terminals 1a. Hence, the time of the standard timer 51 is a standard time for all the timers. In other words, all the timers clock equally to the standard timer 51.

The arrangements of the copying machine 2 and the modem controller 3 included in the copying terminal according to this embodiment are equal to those of the previous embodiment as shown in FIGS. 2 to 3. Hence, the further described about these arrangements will not be descriptive (refer to the description about them in the previous embodiment).

In turn, the procedure for the communication system arranged as above will be partially described by referring to FIG. 7.

The timer 36 of the modem controller 3 counts time. When the count time reaches a predetermined time t1, the microcomputer 21 recognizes the actual time as the data transmission time and starts to send the data for maintenance to the host computer (n101 to n102 of FIG. 7). When the data transmission is terminated, the host computer 5 sends the time T of the standard timer to the copying terminal. Then, the time T of the standard timer is compared with the time t of the modem controller 3. If the difference is equal to or more than the predetermined value Δt, the time T received from the host computer 5 is replaced with the time t of the timer. Later, on the new time, the counting is proceeded (n103 to n104 to n105).

In this manner, the time t of the timer provided in each of the copying terminals 1a is fitted to the time T of the standard timer 51 provided in the host computer 5.

Many widely different embodiments of the present invention may be constructed without departing from the spirit and scope of the present invention. It should be understood that the present invention is not limited to the specific embodiments described in the specification, except as defined in the appended claims.

What is claimed is:

1. A communication system for implementing maintenance of a copying machine comprising:

a copying terminal having a counter for counting data for maintenance, input keys, and a communication modem;

a host computer having a communication modem;

a communication line connecting said copying terminal with said host computer, said copying terminal further having inputting means for inputting communication conditions including maintenance data to be sent and a transmission time to be set by operating said input keys, comparing means for comparing the transmission time set by said maintenance data from said copying terminal when said comparing means recognizes said actual time is equal to said transmission time, and sending means for sending said maintenance data read by said reading means to said host computer, wherein said communication conditions are allowed to be set according to a kind of said copying terminal and a maintenance policy of each maintenance personnel.

2. A communication system according to claim 1, wherein said maintenance data is a total number of copied sheets or jammed sheets.

* * * * *